(12) United States Patent
Kamada et al.

(10) Patent No.: US 11,993,737 B2
(45) Date of Patent: May 28, 2024

(54) SURFACE PROTECTION FILM

(71) Applicant: BANDO CHEMICAL INDUSTRIES, LTD., Hyogo (JP)

(72) Inventors: Yutaka Kamada, Hyogo (JP); Arata Tani, Hyogo (JP); Toshihiko Horie, Saitama (JP); Soh Kato, Saitama (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 545 days.

(21) Appl. No.: 16/618,162

(22) PCT Filed: May 29, 2018

(86) PCT No.: PCT/JP2018/020485
§ 371 (c)(1),
(2) Date: Nov. 29, 2019

(87) PCT Pub. No.: WO2018/221490
PCT Pub. Date: Dec. 6, 2018

(65) Prior Publication Data
US 2020/0339840 A1 Oct. 29, 2020

(30) Foreign Application Priority Data

May 31, 2017 (JP) .................................. 2017-107569

(51) Int. Cl.
*C09J 7/29* (2018.01)
*B32B 7/12* (2006.01)
(Continued)

(52) U.S. Cl.
CPC .................. *C09J 7/29* (2018.01); *B32B 7/12* (2013.01); *B32B 27/36* (2013.01); *B32B 27/40* (2013.01);
(Continued)

(58) Field of Classification Search
None
See application file for complete search history.

(56) References Cited

U.S. PATENT DOCUMENTS

| 4,605,681 A | * | 8/1986 | Grey | .................. C08G 18/2805 521/170 |
| 2009/0305049 A1 | * | 12/2009 | Kobuchi | ................. B32B 27/40 428/476.3 |

(Continued)

FOREIGN PATENT DOCUMENTS

| CN | 106103526 | 11/2016 |
| JP | H06180628 | 6/1994 |

(Continued)

OTHER PUBLICATIONS

"Hardness Testing of Elastomers—Shore and IRHD Scales Compared." MacLellan Rubber, https://maclellanrubber.com/blog/article/rubber-shore-hardness-scales. Accessed Mar. 14, 2022. (Year: 2022).*

(Continued)

*Primary Examiner* — Scott R. Walshon
*Assistant Examiner* — Thomas A Mangohig
(74) *Attorney, Agent, or Firm* — JCIPRNET (57) ABSTRACT

The present invention addresses the problem of providing a surface protection film which provides an excellent writing sensation when a touch pen is used thereon and excellent scratch resistance against a touch pen. As a solution, provided is a surface protection film which has on the outermost surface thereof a protection layer formed of a polyurethane, wherein the polyurethane has an international rubber hardness degree (IRHD) of 87.0-98.0 and a tan δ peak value of 0.6 or more.

11 Claims, 2 Drawing Sheets

(51) Int. Cl.
    *B32B 27/36*     (2006.01)
    *B32B 27/40*     (2006.01)
    *C09J 7/20*     (2018.01)
    *C09J 7/25*     (2018.01)
    *C09J 7/40*     (2018.01)
    *G02B 1/14*     (2015.01)

(52) U.S. Cl.
    CPC ............... *C09J 7/201* (2018.01); *C09J 7/25* (2018.01); *C09J 7/405* (2018.01); *G02B 1/14* (2015.01); *B32B 2307/748* (2013.01); *B32B 2571/00* (2013.01); *C09J 2203/326* (2013.01); *C09J 2475/006* (2013.01)

(56) References Cited

U.S. PATENT DOCUMENTS

| | | | | |
|---|---|---|---|---|
| 2013/0045372 | A1* | 2/2013 | O'Donnell | B32B 27/08 428/354 |
| 2017/0165950 | A1* | 6/2017 | Leatherdale | B32B 27/365 |
| 2020/0339840 | A1 | 10/2020 | Kamada et al. | |

FOREIGN PATENT DOCUMENTS

| | | |
|---|---|---|
| JP | 2014029432 | 2/2014 |
| JP | 2015194921 | 11/2015 |
| JP | 2016060833 | 4/2016 |
| JP | 6487132 | 3/2019 |
| WO | 2014141866 | 9/2014 |
| WO | 2016093133 | 6/2016 |
| WO | 2017094480 | 6/2017 |
| WO | 2018038069 | 3/2018 |

OTHER PUBLICATIONS

"International Search Report (Form PCT/ISA/210) of PCT/JP2018/020485," dated Aug. 7, 2018, with English translation thereof, pp. 1-3.

"International Preliminary Report of Patentability (Form PCT/IB/373) of PCT/JP2018/020485", with English translation thereof, dated Dec. 12, 2019, pp. 1-11.

"Office Action of Taiwan Counterpart Application", dated Nov. 2, 2021, with English translation thereof, p. 1- p. 15.

"Office Action of China Counterpart Application", dated May 27, 2021, with English translation thereof, p. 1-p. 14.

* cited by examiner

SURFACE PROTECTION FILM

CROSS-REFERENCE TO RELATED APPLICATION

This application is a 371 application of the international PCT application serial no. PCT/JP2018/020485, filed on May 29, 2018, which claims the priority benefits of Japan application no. 2017-107569, filed on May 31, 2017. The entirety of the above-mentioned patent application is hereby incorporated by reference herein and made a part of this specification.

TECHNICAL FIELD

The present invention relates to a surface protection film for protecting a transparent substrate on a surface of a display.

BACKGROUND ART

In electronic devices including displays such as smartphones, tablet type PCs, portable music players, and the like, in order to protect transparent substrates which are surfaces of the displays, surface protection films are attached thereto in many cases. Surface protection films are required to have light transmittance, non-coloring properties, weather resistance, plasticizer resistance, antifouling properties, and the like. Furthermore, in recent years, these electronic devices have generally been operated using capacitive touch panels, and there are new requirements such for touch pen writing quality, operability, scratch resistance, and self-repairing properties so that a film pressed with a distal end of a touch pen returns to its original state over time.

As such surface protection films, for example, the present applicant and others propose, as in Patent Literature 1, a surface protection film obtained by laminating three layers, i.e., a protective layer including a thermosetting polyurethane which is a cured product of a polyether polyol, an aliphatic isocyanate, an alcohol-based curing agent, and a non-amine catalyst, a transparent base film, and an adhesive layer in this order, and as in Patent Literature 2, a surface protection film obtained by laminating three layers, i.e., a protective layer made of polycarbonate-based polyurethane, a transparent base film, and an adhesive layer in this order.

REFERENCE LIST

Patent Literature

Patent Literature 1: PCT International Publication No. WO 2017/094480
Patent Literature 2: PCT International Publication No. WO 2018/038069

SUMMARY

Technical Problem

An objective of the present invention is to provide a surface protection film with which there is an excellent writing sensation with a touch pen and with which there is excellent scratch resistance in response to a touch pen.

Solution to Problem

The configuration of the present invention for accomplishing the above-described objective is as follows.

1. A surface protection film includes: a protective layer made of a polyurethane on the outermost surface thereof, wherein the polyurethane has an international rubber hardness degree (IRHD) of 87.0 or more and 98.0 or less and a tan δ peak value of 0.6 or more.
2. In the surface protection film as set forth in 1, a tan δ peak temperature of the polyurethane is −20° C. or more and 60° C. or less.
3. In the surface protection film as set forth in 1 or 2, at least three layers, i.e., the protective layer made of a polyurethane, a transparent base film, and an adhesive layer are laminated in this order.
4. In the surface protection film as set forth in any one of 1 to 3, the polyurethane is of a polycarbonate-based polyurethane or of a polyester-based polyurethane.
5. In the surface protection film as set forth in any one of 1 to 4, the protective layer has a thickness of 50 μm or more and 300 μm or less.
6. A surface protection film laminate includes: a mold release film laminated on the surface of the surface protection film according to any one of 1 to 5 on the protective layer side; and a release film laminated on the other surface thereof.
7. A method for producing a surface protection film having a protective layer made of a polyurethane on the outermost surface thereof and the polyurethane having an international rubber hardness degree (IRHD) of 87.0 or more and 98.0 or less and a tan δ peak value of 0.6 or more includes: pouring a material composition into a gap between first and second gap holding members sent out using a pair of rolls spaced apart from each other; and thermally curing the material composition while the material composition is held between the first and second gap holding members to form the protective layer.
8. In the method for producing a surface protection film as set forth in 7, one of the first and second gap holding members is set as a transparent base film of the surface protection film.
9. In the method for producing a surface protection film as set forth in 7 or 8, the polyurethane has a tan δ peak temperature of -20° C. or more and 60° C. or less.
10. In the method for producing a surface protection film as set forth in any one of 7 to 9, the polyurethane is a polycarbonate polyurethane or a polyester polyurethane.
11. In the method for producing a surface protection film as set forth in any one of 7 to 10, one of the first and second gap holding members is a film which is not subjected to a release treatment and the other thereof is a film which is subjected to a release treatment.
12. In the method for producing a surface protection film as set forth in any one of 7 to 11, the other of the first and second gap holding members is a film having unevenness and the material composition is held on a side of the film having the unevenness.

Advantageous Effects of Invention

Since the surface protection film of the present invention includes a protective layer made of a polyurethane and having an international rubber hardness degree (IRHD) of 87.0 or more and 98.0 or less, a good writing sensation using a touch pen is provided and a writing sensation as if writing were being performed on paper using a pencil is provided. Furthermore, since the protective layer made of a polyurethane has a tan δ peak value of 0.6 or more, even if a touch pen rubs a surface during an operation, scratches are difficult to be formed and excellent scratch resistance is provided. In addition, since the protective layer made of a polyurethane is used in the surface protection film of the present invention, excellent light transmittance, non-colorability, and weather resistance are provided.

The surface protection film of the present invention has optical properties in which the surface protection film can be used as a surface protection film and has excellent self-repairing properties even though the protective layer has a thickness of 50 μm or more and 300 μm or less. Furthermore, by forming unevenness in the surface of the protective layer, it is also possible to impart anti-glare properties.

A protective layer made of a polycarbonate-based polyurethane has excellent plasticizer resistance and a protective layer made of a polyester-based polyurethane has excellent plasticizer resistance and oil resistance. For this reason, discoloration, swelling, and the like do not easily occur in the protective layer made of these polyurethanes even if it comes into contact with various rubber products and oils.

A surface protection film laminate obtained by laminating a mold release film and a release film on a surface protection film of the present invention can prevent a surface protection film from being scratched and contaminated and has excellent handleability.

It is possible to continuously produce the surface protection film using the production method of the present invention. Furthermore, it is possible to produce a protective layer having a thickness of 50 μm or more and 300 μm or less which is difficult to be produced using a wet coating method without deteriorating its optical characteristics. In addition, it is possible to easily form unevenness in a surface of a protective layer using a transfer method.

REFERENCE SIGNS LIST

1 Protective layer
2 Transparent base film
3 Adhesive layer
4 Mold release film
5 Release film
10 Surface protection film
20 Transparent substrate
30 Surface protection film laminate
40 Sheet-like product
40a Material composition
41 Casting machine
41a Head part
42a First gap holding member
42b Second gap holding member
43a Conveyance roll
43b Conveyance roll
44 Conveyance roller
45 Auxiliary roller
46 Heating device
47 Conveyor belt

DESCRIPTION OF THE EMBODIMENTS

Figure 1:
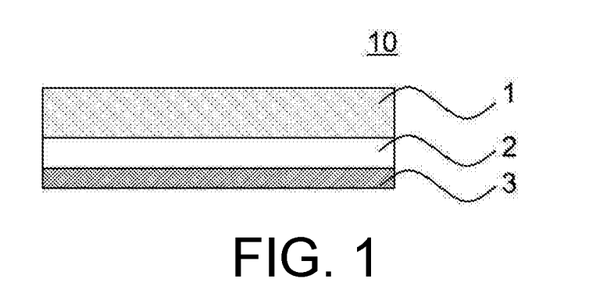
FIG. 1 is a diagram illustrating a surface protection film according to an embodiment of the present invention.
Figure 2:
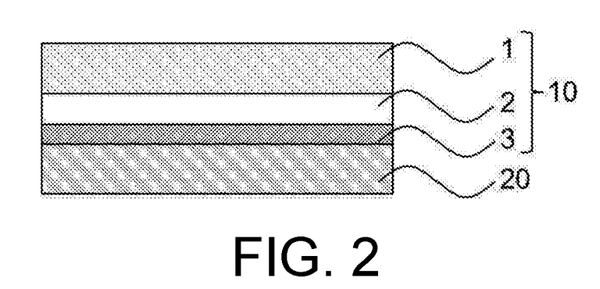
FIG. 2 is a diagram illustrating a state in which the surface protection film according to an embodiment of the present invention is adhered to a transparent substrate of a surface of a display.

FIGS. 1 and 2 respectively illustrate a surface protection film according to an embodiment of the present invention, and a state in which the surface protection film according to an embodiment is adhered to a transparent substrate located on a surface of the display. In FIGS. 1 and 2, a thickness of each layer does not indicate the actual thickness.

A surface protection film 10 of an embodiment is obtained by laminating three layers, i.e., a protective layer 1 made of polyurethane, a transparent base film 2, and an adhesive layer 3 in this order. Furthermore, the surface protection film 10 of an embodiment is adhered onto a transparent substrate 20 with the adhesive layer 3 therebetween.

In this way, since the surface protection film of the present invention is adhered to a surface of the transparent substrate, the surface protection film prevents the transparent substrate from being scratched, cracking, and becoming contaminated.

"Protective Layer"

A protective layer is made of polyurethane. Polyurethane is obtained by causing a material composition containing at least a polyol, an isocyanate, and an alcohol-based curing agent to react. The polyurethane used in the present invention is thermally cured as is apparent from the producing method described below in detail.

a. Polyol

Examples of polyol include polyether-based polyols of polyoxyalkylene glycols such as polyethylene glycol, polypropylene glycol, and polyoxytetramethylene glycol or alkylene oxide adducts such as ethylene oxide adducts of bisphenol A and glycerin, or propylene oxide adducts of bisphenol A and glycerin; polyester-based polyols obtained through a polymerization reaction between dibasic acids such as adipic acid, phthalic anhydride, isophthalic acid, maleic acid, and fumaric acid and glycols such as ethylene glycol, propylene glycol, 1,4-butanediol, 1,6-hexanediol, and trimethylolpropane; polycaprolactone polyols such as polycaprolactone glycol, polycaprolactone triol, and polycaprolactone tetraol; polycarbonate-based polyols such as polycarbonate glycol, polycarbonate triol, and polycarbonate tetraol, and the like; and derivatives from introducing side chains or branched structures thereto, modified products thereof, mixtures of these, and the like.

Among these, polycarbonate-based polyurethanes obtained from polycarbonate-based polyols have excellent plasticizer resistance and are prevented from swelling due to the transferring of a plasticizer due to contact with a rubber product or the like. Furthermore, polyester-based polyurethanes obtained from polyester-based polyols has excellent plasticizer resistance and oil resistance and are prevented from swelling due to the transferring of a plasticizer and various oils such as hand cream and sunscreen.

a1. Polycarbonate-based polyol

Examples of polycarbonate-based polyol include a reaction product of a dialkyl carbonate and a diol. Furthermore, examples of polycarbonate-based polyol also include polycarbonate glycol, polycarbonate triol, polycarbonate tetraol, derivatives obtained by introducing side chains and branched structures thereto, modified products thereof, mixtures of these, and the like.

Examples of the dialkyl carbonate include dialkyl carbonates such as dimethyl carbonate and diethyl carbonate, diaryl carbonates such as diphenyl carbonate, alkylene carbonates such ethylene carbonate, and the like. Each of these may be used independently and a combination of two or more of these may be used.

Examples of the diol include 1,4-butanediol, diethylene glycol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, 2,2'-bis(4-hydroxycyclohexyl)-propane, and the like. Each of these may be used independently and a combination of two or more of these may be used. As the diol, an aliphatic diol having 4 to 9 carbon atoms or an alicyclic diol is desirable. For example, it is desirable that 1,4-butanediol, diethylene glycol, 1,5-pentanediol, 1,6-hexanediol, 3-methyl-1,5-pentanediol, 2,4-dimethyl-1,5-pentanediol, 1,4 -cyclohexanedimethanol, 1,7-heptanediol, 1,8-octanediol, 2-methyl-1,8-octanediol, and 1,9-nonanediol be used independently or a combination of two or more of these be used. Furthermore, diols having no branched structure are more desirable.

a2. Polyester-Based Polyol

Examples of the polyester-based polyol include a polyester-based polyol obtained through a polymerization reaction between dibasic acids such as succinic acid, adipic acid, phthalic anhydride, isophthalic acid, maleic acid, and fumaric acid and glycols such as ethylene glycol, propylene glycol, 1,4-butanediol, 1,6-hexanediol, and trimethylolpropane.

Among these, succinic acid ester-based polyurethanes using succinic acid as a dibasic acid are particularly desirable because of their excellent oil resistance.

The number average molecular weight of the polyester-based polyol is preferably 200 or more and 10,000 or less, more preferably 500 or more and 5,000 or less, and even more preferably 800 or more and 3,000 or less. When the number average molecular weight is less than 200, a reaction is too fast and the handleability is poor, and a molded product loses its flexibility and thus becomes brittle in some cases. On the other hand, when the number average molecular weight is more than 10,000, the viscosity is too high, the handleability is poor, and a molded product may become crystallized and thus become cloudy in some cases. In the present invention, the number average molecular weight refers to a molecular weight calculated from a hydroxyl value of a polyol measured in accordance with JIS K1557. Here, even if the number average molecular weight is outside of the above-mentioned numerical range, the number average molecular weight is not excluded unless the number average molecular weight deviates from the gist of the present invention.

b. Isocyanate

Any isocyanate can be used without particular limitation as long as it has two or more isocyanate groups in a molecule. For example, tolylene diisocyanate, tolidine diisocyanate, diphenylmethane diisocyanate, polymethylene polyphenyl polyisocyanate, carbodiimidized diphenylmethane polyisocyanate, crude diphenylmethane diisocyanate, xylylene diisocyanate, 1,5-naphthalene diisocyanate, tetramethylxylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate, and the like can be used. Two or more of these may be used in combination.

In the present invention, it is desirable that the polyurethane which forms the protective layer use an aliphatic isocyanate having no aromatic ring as an isocyanate component. A polyurethane obtained from an aliphatic isocyanate does not easily yellow and can prevent the polyurethane from discoloring due to light or heat from a light source, sunlight, and the like, thereby reducing transparency.

c. Alcohol-Based Curing Agent

The polyurethane which forms the protective layer of the present invention uses an alcohol-based curing agent as a curing agent. An alcohol-based curing agent has less adverse effects on the human body and the environment than an amine-based curing agent.

Any alcohol-based curing agent can be used without particular limitation as long as it has two or more hydroxy groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexanedimethanol, and hydrogenated bisphenol A, trihydric alcohols such as glycerin, trimethylolpropane, butanetriol, pentanetriol, hexanetriol, cyclopentanetriol, and cyclohexanetriol, and trihydric or higher alcohols such as pentaerythritol, dipentaerythritol, and tetramethylolpropane may be exemplified. Among these, as dihydric alcohol, 1,4-butanediol is desirable in view of handleability and mechanical properties and dihydric alcohols having a cyclic structure such as cyclohexanedimethanol and hydrogenated bisphenol A are desirable in view of preventing cloudiness. As trihydric alcohol, trimethylolpropane is desirable in view of handleability and mechanical properties.

It is desirable to use dihydric alcohol and trihydric alcohol together due to the fact that a molded body crystallizes and is cloudy in some cases when dihydric alcohol is independently used as an alcohol-based curing agent and the fact that strength decreases when trihydric alcohol is used as a main component. To be specific, it is desirable that dihydric alcohol and trihydric alcohol be used in the range of 50 to 100 parts by weight of dihydric alcohol and 50 to 0 parts by weight of trihydric alcohol and it is more desirable that dihydric alcohol and trihydric alcohol be used in the range of 60 to 80 parts by weight of dihydric alcohol and 40 to 20 parts by weight of trihydric alcohol. Moreover, in a case in which a cloudy state occurs when 1,4-butanediol is used as a dihydric alcohol, a part or all of 1,4-butanediol may be replaced with a dihydric alcohol having a cyclic structure.

d. Catalyst

It is desirable that the polyurethane which forms the protective layer of the present invention is thermally cured in the presence of a non-amine catalyst. Using a non-amine catalyst, it is possible to obtain a polyurethane having excellent non-coloring property, transparency, and weather resistance. On the other hand, in a polyurethane obtained through thermal curing using an amine-based catalyst, outgoing light becomes yellow and an outer form becomes colored over time in some cases.

Examples of the non-amine catalyst include organotin compounds such as di-n-butyltin dilaurate, dimethyltin dilaurate, dibutyltin oxide, and octane tin, organic titanium compounds, organic zirconium compounds, carboxylic acid tin salts, and carboxylic acid bismuth salts, and the like. Among these, organotin compounds are desirable because they allow a reaction rate to be adjusted easily.

It is desirable that 0.0005 wt % or more and 3.0 wt % or less of the non-amine catalyst be added with respect to the total amount of a to c described above. When the non-amine catalyst is less than 0.0005 wt %, a reaction rate may not be sufficiently rapid and thus a molded body may not be able to be obtained efficiently. When the non-amine catalyst is more than 3.0 wt %, a reaction rate is too fast and thus problems in which it is not possible to obtain a molded product having a uniform thickness, heat resistance and weather resistance of the molded product are reduced, light transmittance decreases, and the molded product is colored occur in some cases. Here, even if the amount of non-amine catalyst to be added is outside of the above-mentioned numerical range, the amount is not excluded unless the amount deviates from the gist of the present invention.

e. Silicone-Based Additive

In the surface protection film of the present invention, it is desirable that the polyurethane which forms the protective layer contain a silicone-based additive. Since the polyurethane contains a silicone-based additive, it is possible to improve slipperiness and comfortably perform a touch panel operation using a touch pen, a finger, or the like. A lower limit of an amount of silicone-based additive to be added is preferably 0.05 wt % or more, more preferably 0.1 wt % or more, and even more preferably 0.3 wt % or more with respect to the total amount of a. to c. described above. Furthermore, an upper limit of an amount of silicone-based additive to be added is preferably 10.0 wt % or less, more preferably 9.0 wt % or less, and even more preferably 7.0 wt % or less with respect to the total amount of a. to c. described above. When an amount of silicone-based additive to be added is less than 0.05 wt %, the sufficient improvement of slipperiness is not provided in some cases. On the other hand, when the amount of silicone-based additive to be added is more than 10.0 wt %, the slipperiness becomes too good and thus the pen tip of a touch pen slips too much in some cases. Here, even if the amount of silicone-based additive to be added is outside of the above-mentioned numerical value range, the amount is not excluded unless the amount deviates from the gist of the present invention.

The silicone-based additive can be contained in the polyurethane by adding the silicone-based additive to the material composition in which the polyurethane is not thermally cured, and then thermally curing the material composition. Furthermore, it is desirable to use a non-reactive additive which does not form a covalent bond with a crosslinked network formed using a polyol, an isocyanate, and an alcohol-based curing agent as the silicone-based additive. Since the non-reactive silicone-based additive gradually bleeds out on a surface of the protective layer, it is possible to impart slipperiness over a long period of time. The silicone-based additive can be used without particular limitation as long as it is not subjected to phase separation from the material composition which is yet subjected to thermal curing. For example, polyether-modified polydimethylsiloxane, polyaralkyl-modified polydimethylsiloxane, and long-chain alkyl-modified polydimethylsiloxane can be used. To be specific, it is possible to use commercially available products such as KF352A, KF615A, X22-4515, KF410, KF412, and the like manufactured by Shin-Etsu Chemical Co., Ltd.

The polyurethane which forms the protective layer can contain various additives such as a colorant, a light stabilizer, a heat stabilizer, an antioxidant, an antifungal agent, a flame retardant, and a lubricant as necessary as long as the required characteristics are not impaired.

The protective layer is the molded body made of the polyurethane obtained by curing a material composition containing at least a polyol, an isocyanate, and an alcohol-based curing agent in the presence of the catalyst. The molding method may be any one of a one-shot method, a prepolymer method, and a pseudo prepolymer method.

In the one-shot method, it is possible to prepare a molded body made of a polyurethane by inputting a polyol, an isocyanate, an alcohol-based curing agent, any additive, and a catalyst together and curing them.

In the prepolymer method, it is possible to prepare a molded body made of a polyurethane by causing a polyol and a stoichiometric excess of an isocyanate to react to prepare a prepolymer having an isocyanate group at a terminal in advance, incorporating a predetermined amount of an alcohol-based curing agent, any additives, and a catalyst into the prepared prepolymer, and curing the prepolymer.

In the pseudo prepolymer method, a part of a polyol is mixed with an alcohol-based curing agent in advance and a prepolymer is prepared using the remaining polyol and an isocyanate. In addition, it is possible to prepare a molded product made of a polycarbonate-based polyurethane by mixing a mixture of a polyol and an alcohol-based curing agent which have been mixed in advance, any additive, and a catalyst with the prepared prepolymer and curing them.

In the present invention, a ratio (—OH/—NCO: hereinafter referred to as an "α ratio") between the number of moles of hydroxyl groups (—OH) contained in an alcohol-based curing agent and the number of moles of isocyanate groups (—NCO) of an isocyanate or a prepolymer in a material composition in which a polyurethane is not thermally cured is preferably 0.8 or more and 1.5 or less. When the α ratio is less than 0.8, mechanical properties are unstable. In addition, when the α ratio is more than 1.5, surface tackiness increases and excellent writing sensation is impaired. Furthermore, the α ratio is more preferably 1.05 or more and 1.3 or less because then the polyurethane which constitutes the protective layer deforms appropriately and scratch resistance is improved.

Also, it is desirable that a polyurethane do not contain an acrylic skeleton (an acrylic skeleton or a methacrylic skeleton). That is to say, it is desirable that the polyurethane which forms the protective layer of the present invention do not contain an acrylic-modified polyurethane. A polyurethane having an acrylic skeleton impairs the flexibility of a polyurethane and reduces wear resistance and a mechanical strength such as tear strength in some cases. In addition, outgoing light is colored due to the residue of a catalyst used to introduce the acrylic skeleton or a methacrylic skeleton in some cases.

In the present invention, the polyurethane which forms the protective layer is characterized by having an international rubber hardness degree (IRHD) of 87.0 or more and 98.0 or less and a tan δ peak value of 0.6 or more.

If the international rubber hardness degree is less than 87.0, when an operation is performed using a touch pen, a pen tip thereof pushes too far into the protective layer, which causes the movement of the pen to become heavy. On the other hand, when the international rubber hardness degree is more than 98.0, the pen tip thereof does not push into the protective layer. Thus, a feeling of resistance is small when an operation is performed using a touch pen and the pen moves too lightly.

If the tan δ peak value is less than 0.6, the sufficient scratch resistance of the polyurethane is not provided and it becomes easy to be damaged during an operation using a touch pen. When the tan δ peak value is 0.6 or more, excellent scratch resistance is provided and scratches and marks are hardly left. Furthermore, the tan δ peak value is preferably 1.39 or less. When the tan δ peak value is more than 1.39, plasticity is high and deformation is difficult to be recovered in some cases.

The present inventors estimate as follows why the scratch resistance is excellent when the tan δ peak value is 0.6 or more.

Tan δ (a loss tangent) is a ratio (E"/E') between a storage elastic modulus (E') and a loss elastic modulus (E"). The storage elastic modulus E' corresponds to an amount of elastic component in the polyurethane and the loss elastic modulus E" corresponds to an amount of viscous component in the polyurethane. When the tan δ is measured while a temperature is being changed, the tan δ increases up to a certain temperature and decreases when the temperature exceeds this certain temperature. That is to say, when the tan δ is measured while a temperature is being changed, a maximum value appears. A temperature at which the maximum value appears is a tan δ peak temperature (a glass-transition temperature) and the maximum value is a tan δ peak value.

The tan δ peak value correlates with an amount of fine elements which are not constrained and can move at the tan δ peak temperature. For this reason, when the tan δ peak value increases, fine deformation easily tends to be performed easily.

During a rotary writing test, the polyurethane is pulled during the passage of a touch pen and returns to the original state after the passage. Thus, slight expansion and contraction repeatedly occur. When the tan δ peak value is 0.6 or more, a good balance between micro-elastic components and micro-viscous components in the polyurethane is provided, the polyurethane acts like a fine spring against slight expansion and contraction during rotary writing, and it is estimated that the polyurethane is not easily destroyed even if the polyurethane is repeatedly subjected to tension, frictional heat, or the like due to pressure from a pen.

It is possible to adjust the hardness, the tan δ peak value, and the tan δ peak temperature by controlling a design of a distance between crosslinking points and the morphology of hard segments/soft segments. To be specific, adjustment can be performed using a molecular skeleton, a molecular weight, and the number of functional groups of a urethane soft segment constituting the polyurethane, an amount of hard segments, a mixing ratio of dihydric elements/trihydric elements in the alcohol-based curing agent, and the like.

The tan δ peak temperature of the polyurethane which forms the protective layer is preferably −20° C. or more60° C. or less. When the tan δ peak temperature is within this range, the polyurethane has good viscoelasticity, self-repairing properties, scratch resistance, and the like under the environment used as the surface protection film.

Also, it is desirable that the storage elastic modulus at 25° C. of the polyurethane which forms the protective layer be preferably $1.0 \times 10^7$ or more and $5.0 \times 10^9$ or less and a tan δ value at 25° C. be preferably 0.3 or more in view of the scratch resistance.

A thickness of the protective layer is preferably 50 μm or more and 300 μm or less, more preferably 100 μm or more and 200 μm or less. When the protective layer has a thickness of 50 μm or more and 300 μm or less, excellent writing sensation and slipperiness of a touch pen and excellent operability and self-repairability are provided. When the thickness of the protective layer is less than 50 μm, writing sensation and self-repairability are reduced. When the thickness of the protective layer is more than 300 μm, writing sensation, slipperiness, operability, and self-repairability are reduced and it is difficult to perform molding to have a uniform thickness. When the thickness of the protective layer is 50 μm or more and 300 μm or less, the performance required for the surface protection film is exhibited in a well-balanced manner and production is easy.

"Transparent Base Film"

A transparent base film holds a protective layer. A material constituting the transparent base film can be used without particular limitation as long as it has excellent transparency, flexibility, and mechanical strength and polyethylene terephthalate (PET), polyethylene naphthalate (PEN), polycarbonate (PC), cyclic olefin resin (COP), polyimide (PI), and the like can be suitably used as the material.

A thickness of the transparent base film is preferably 50 μm or more and 500 μm or less. In the surface protection film of the present invention, a thermal expansion coefficient of a polyurethane which forms the protective layer is usually larger than a thermal expansion coefficient of a material constituting the transparent base film. Thus, when the thickness of the transparent base film is less than 50 μm, the transparent base film is not sufficiently resistant to the shrinkage of the protective layer at low temperatures and the surface protection film peels off from the transparent substrate in some cases. When the thickness of the transparent base film is more than 500 μm, the surface protection film is bulky and the production costs thereof increases. Furthermore, the operability when the transparent base film is adhered to a surface of a touch panel type display is reduced. Description will be provided in detail in the "method for producing the protective layer" which will be described later, but the protective layer can be formed directly above the transparent base film. When this producing method is used, in order to prevent deformation during heating when the material composition is thermally cured to form the protective layer, it is desirable that the transparent base film be thicker. Here, even if the thickness is outside of the above-mentioned numerical range, the thickness is not excluded unless the thickness deviates from the gist of the present invention.

"Adhesive Layer"

An adhesive layer is used to adhere the surface protection film onto the transparent substrate of the surface of the display. A type of adhesive is not particularly limited and an adhesive made of an acrylic-based resin, an epoxy-based resin, a urethane-based resin, a silicone-based resin, or the like can be used. Among these, an adhesive made of an acrylic-based resin can be adhered to even a transparent substrate which has been subjected to a surface treatment such as an antifouling treatment and a low reflection treatment. Furthermore, an adhesive made of a silicone-based resin has excellent wetting property, hardly causes bubbles when adhered to the transparent substrate, has good re-peeling properties, and hardly any thereof remains at the time of peeling off. A thickness of the adhesive layer is usually in the range of 5 μm or more and 60 μm or less, but can be adjusted appropriately in accordance with the required specifications.

"Surface Protection Film"

A surface protection film 10 as an embodiment is obtained by laminating three layers, i.e., a protective layer 1 made of a polyurethane, a transparent base film 2, and an adhesive layer 3 in this order. In the surface protection film of the present invention at least the above-described three layers only needs to be laminated in this order. For example, an intermediate layer configured to enhance adhesion between layers and a blue light cut layer configured to cut blue light can also be provided.

A haze value of the surface protection film is preferably 0.1% or more and 40% or less. Furthermore, the total light transmittance of the surface protection film is preferably 90% or more. When the haze value is more than 40% or the total light transmittance is less than 90%, the visibility of a display is reduced. Here, when a blue light cut layer configured to cut visible light of a blue region is provided, the total light transmittance is preferably 60% or more. When the haze value of the surface protection film is 0.1% or more and less than 3%, a clear outer form can be obtained. When the haze value of the surface protection film is 3% or more and 40% or less, it is possible to impart anti-glare properties to the surface protection film. Furthermore, in the surface protection film having anti-glare properties, scratches present in the surface of the protective layer are not easily distinguished. In order to make the surface protection film have a haze value of 3% or more and 40% or less, unevenness may be formed in the surface of the protective layer. An unevenness shape of the surface of the protective layer is not particularly limited as long as it has the above-mentioned haze value and total light transmittance and may be appropriately adjusted in accordance with a refractive index, light absorption, and the like of a material to be used, but an average length (RSm) of a roughness curve element is usually about 10 µm or more and 80 µm or less. Furthermore, an arithmetic average roughness Ra is about 0.01 µm or more and 0.3 µm or less and a maximum height Rz is about 0.1 µm or more and 2.0 µm or less.

Figure 3:
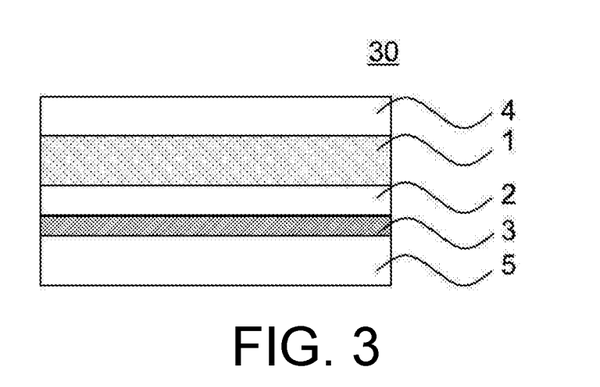
FIG. 3 is a diagram illustrating a surface protection film laminate.

In order to protect a surface protection film of the present invention until it is adhered to the transparent substrate of the surface of the display, it is possible to make the surface protection film laminate by adhering a mold release film to the surface of the surface protection film on the protective layer side and a release film to the other surface thereof. FIG. 3 illustrates a surface protection film laminate 30 obtained by adhering a mold release film 4 and a release film 5 onto the surface protection film 10 as an embodiment. In FIG. 3, the thickness of each layer does not mean the actual thickness.

The mold release film is for the purpose of preventing the protective layer from becoming dirty, adhering of dust, and having scratches and it is desirable to use a film having a surface on the side to be adhered to the protective layer which has been subjected to a release treatment. When the mold release film which has been subjected to a release treatment is released from the protective layer, a release agent moves to the protective layer surface and can impart slipperiness to the protective layer surface immediately after the mold release film is released, and thus it is possible to perform a touch operation without causing uncomfortable feeling immediately after starting of using. Furthermore, description will be provided in detail in the "method for producing the protective layer" below, but the protective layer can be formed directly above the mold release film. In this case, in order to prevent deformation during heating when the material composition is thermally cured to form the protective layer, a thickness of the mold release film is preferably 50 µm or more and 300 µm or less and more preferably thicker.

It is desirable that the release film be adhered to the adhesive layer to prevent dirt, dust adhesion, a decrease in adhesive strength, and the like. The release film is not particularly limited and it is possible to appropriately use a film having a surface on a side to be adhered to the adhesive layer which has been subjected to a release treatment.

"Method for Producing Protective Layer"

A protective layer can be produced using a polyurethane obtained by pouring an uncured material composition into a gap between first and second gap holding members sent out using pair of rolls spaced apart from each other, introducing a material composition into a heating device while the material composition is being held between the two gap holding members, and thermally curing the material composition. The material composition contains at least polyol, isocyanate (or a urethane prepolymer made of any of these), and an alcohol-based curing agent.

Figure 4:
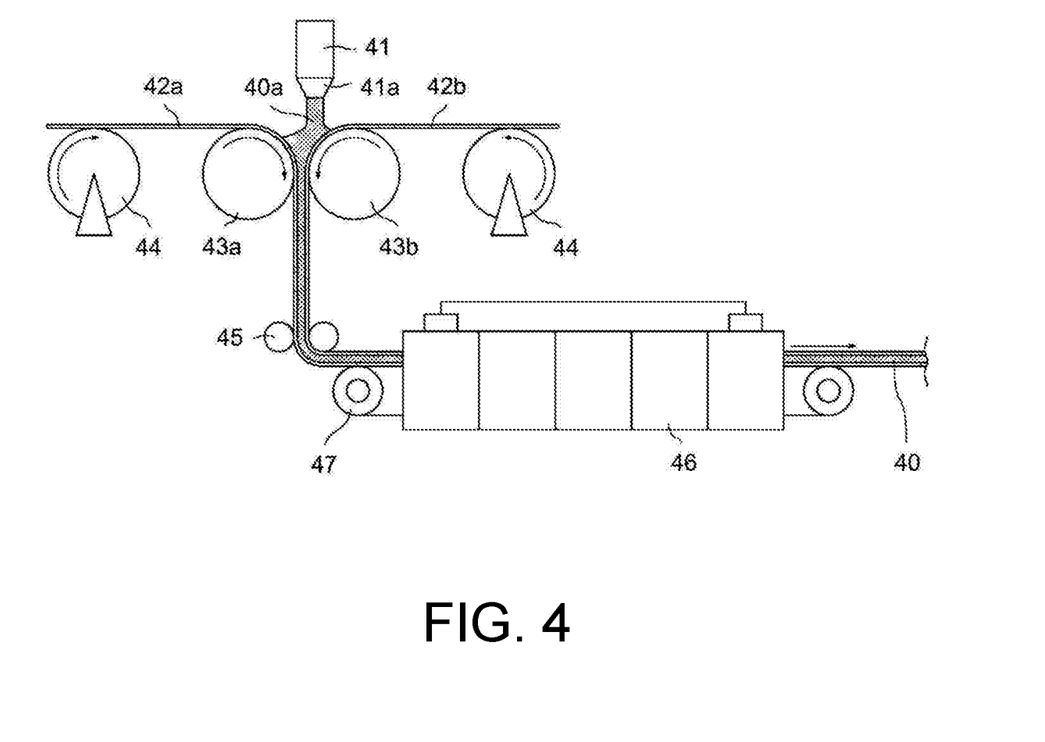
FIG. 4 is a diagram illustrating a method for producing a protective layer of the surface protection film.

FIG. 4 illustrates a schematic diagram of the method for producing the protective layer. The method for producing the protective layer will be described below using FIG. 4.

A material composition 40a is poured into a gap between first and second gap holding members 42a and 42b sent out using a pair of conveyance rolls 43a and 43b spaced apart from each other using a casting machine 41. The first and second gap holding members 42a and 42b are guided into a heating device 46 while the material composition 40a is being held therebetween. A sheet-like product 40 made of a polyurethane is produced by thermally curing the material composition 40a while the material composition 40a is being held between the first and second gap holding members 42a and 42b.

In FIG. 4, conveyance rollers configured to send out the first and second gap holding members 42a and 42b are denoted with 44, auxiliary rollers are denoted with 45, and a conveyor belt configured to convey the first and second gap holding members 42a and 42b having the material composition 40a held therebetween in the heating device 46 is denoted with 47.

The first and second gap holding members 42a and 42b can be used without particular limitation as long as they are materials which do not thermally deform when the material composition is thermally cured. For example, it is possible to use a long film made of a polymer material such as polyethylene terephthalate (PET), polyethylene naphthalate (PEN), polycarbonate (PC), cyclic olefin resin (COP), and polyimide (PI). Although a long film made of a polymer material is used for the gap holding members in the schematic diagram illustrated in FIG. 4, it is also possible to use an endless belt made of such polymer materials or a metal material such as aluminum.

Since the first and second gap holding members 42a and 42b are pulled and conveyed with the same tension while holding the material composition 40a therebetween, the gap can be maintained to have a constant size. Since the material composition 40a is placed between the first and second gap holding members 42a and 42b and cured while a constant thickness is being maintained, the sheet-like product 40 having an excellent thickness precision is obtained. Using this producing method, it is possible to continuously form the sheet-like product 40 having a thickness of 50 µm or more which is difficult to be applied and having practical optical characteristics as a protective layer for the surface protection film.

It is desirable that a position of a head part 41a in the casting machine 41 be unevenly distributed toward one side of the conveyance rolls from a central portion of the conveyance rolls 43a and 43b (a central portion of the gap formed by the first and second gap holding members 42a and 42b) and it is desirable that an uneven distribution distance be equal to or less than a radius of the conveyance rolls. That is to say, it is desirable that a portion directly below the head part 41a in the casting machine 41 be located between a central portion of the pair of conveyance rolls 43a and 43b and a central axis of one of the conveyance rolls. Furthermore, a shortest distance between a distal end portion of the head part 41a and surfaces of the conveyance rolls is preferably 5 cm or less. By arranging the head part 41a in this way, a thickness accuracy of the sheet-like product 40 is further improved, air bubbles are not easily mixed into the uncured material composition 40a poured into the gap between the first and second gap holding members 42a and 42b and the incorporated bubbles are easily removed.

The conveyance rolls 43a and 43b may simply have only a conveyance function, but it is desirable that the conveyance rolls 43a and 43b be heating rolls. When the conveyance rolls are heating rolls, it is possible to perform a curing reaction immediately after the material composition 40a is held in the gap between the first and second gap holding members 42a and 42b, to maintain a further uniform thickness until the material composition 40a is introduced into the heating device 46, and to form the sheet-like product 40 having a better thickness precision. It is desirable that a conveyance surface temperature at the time of heating the conveyance rolls be set to 10° C. or more and 60° C. or less. When the conveyance surface temperature is less than 10° C., a viscosity of the material composition 40a increases and thus air bubbles are not easily removed and a rate of a curing reaction decreases and thus a thickness accuracy of the sheet-like product 40 decreases. When the conveyance surface temperature exceeds 60° C., the material composition 40a is cured on the conveyance rolls or air bubbles are input into the sheet-like product 40 in some cases.

The heating device 46 is a heating furnace which includes a heater and any heating device may be adopted as the heating device 46 as long as it can increase a temperature inside the furnace to a curing temperature of the material composition 40a. Furthermore, heating conditions (curing conditions) in the heating device 46 are not particularly limited, any heating conditions (curing conditions) may be adopted as the heating conditions (curing conditions) as long as they are appropriately set in accordance with a composition of the material composition 40a, and for example, the heating (curing) may be performed under conditions of 40° C. or more and 160° C. or less for 1 minute to 180 minutes or more.

A long laminate formed of the first gap holding member 42a, the sheet-like product 40 made of a polyurethane, and the second gap holding member 42b is carried out from the heating device 46. Moreover, the sheet-like product 40 of the long laminate serves as the protective layer in the surface protection film of the present invention.

"Method for Producing Surface Protection Film Laminate"

In the above-mentioned producing method, it is possible to make one of the first gap holding member 42a and the second gap holding member 42b serve as the transparent base film 2 in the surface protection film 10 of an embodiment. Furthermore, it is possible to make the other of the first gap holding member 42a and the second gap holding member 42b serve as the mold release film 4. A case in which the first gap holding member 42a serves as the transparent base film 2 and the second gap holding member 42b serves as the mold release film 4 will be described below as an example.

Using the above-mentioned producing method, the long laminate formed of the first gap holding member 42a serving as the transparent base film, the sheet-like product 40 made of a polyurethane serving as the protective layer, and the second gap holding member 42b serving as the mold release film is taken out. At this time, it is desirable that a film which has been not subjected to a release treatment be used as the first gap holding member 42a serving as the transparent base film and a film which has been subjected to a release treatment be used as the second gap holding member 42b serving as the mold release film.

Since the adhesive layer is formed on a surface of the long laminate on the first gap holding member 42a side carried out from the heating device using coating or the like and the release film is adhered onto the adhesive layer, it is possible to obtain the long surface protection film laminate 30. Furthermore, it is also possible to use a laminate obtained by laminating a transparent base film/an adhesive layer/a release film in this order as the first gap holding member 42a. In addition, since a film having unevenness is used as the second gap holding member 42b and the material composition 40a is held on a surface thereof having unevenness, it is possible to impart antiglare properties to the obtained protective layer by transferring unevenness to the outermost surface of the sheet-like product 40.

Using this producing method, it is possible to continuously produce the surface protection film laminate 30 using so-called roll to roll processing. Since the produced surface protection film laminate 30 has both surfaces having a mold release film 4 and a release film 5, respectively, and it is possible to prevent the surface protection film from being scratched, contaminated, or the like and has excellent handleability.

The surface protection film laminate may be rolled and shipped in a roll shape or may be shipped after being cut into a sheet shape. Furthermore, it is also possible to ship the long laminate formed of the first gap holding member 42a, the sheet-like product 40 made of a polyurethane, and the second gap holding member 42b or a sheet-like laminate obtained by cutting this long laminate, after which to form an adhesive layer on the long laminate through coating or the like in a display factory or the like, and adhere the sheet-like laminate to the transparent substrate of the display.

The above-described producing method is an example, and for example, it is also possible to produce a long laminate by adhering the protective layer produced through the "method for producing the protective layer" to a sheet-like or roll-like transparent base film.

EXAMPLES

While the present invention will be described below in more detail using examples, the present invention is not limited to these examples.

Example 1

A prepolymer made of PTMG (manufactured by Mitsubishi Chemical Corporation, product name: PTMG1000) having a molecular weight of 1000 and hydrogenated MDI was prepared so that NCO%=10.0% is satisfied. After that, a material composition (an α ratio: 1.05) was obtained by adding 11.6 g of an alcohol-based curing agent with a weight ratio of 4-butanediol/trimethylolpropane=60/40 and 150 ppm of an organotin compound to 100 g of prepolymer and stirring and mixing the mixture.

A surface protection film laminate having a protective layer having a thickness of 150 μm was produced using a laminate obtained by laminating a PET film (corresponding to a release film) having a thickness of 75 μm which has been subjected to a silicone treatment/a silicone-based adhesive layer having a thickness of 50 μm/a PET film (corresponding to a transparent base film) having a thickness of 100 μm in this order as a first gap holding member and a PET film (corresponding to a mold release film) having a thickness of 125 μm which has been subjected to a silicone treatment as a second gap holding member through the above-described molding method.

Example 2

A surface protection film laminate was obtained in the same manner as in Example 1 except that a material composition (an α ratio: 0.95) was obtained by adding 20 g of trimethylolpropane, 54.79 g of xylylene diisocyanate (XDI), and 50 ppm of an organotin compound to 100 g of succinic ester-based polyol (manufactured by Tosoh Corporation, product name: ON300) and stirring and mixing the mixture.

Example 3

A surface protection film laminate was obtained in the same manner as in Example 2 except that a material composition (an α ratio: 0.95) obtained using 15 g of trimethylolpropane and 43.72 g of xylylene diisocyanate (XDI) was used.

Example 4

A surface protection film laminate was obtained in the same manner as in Example 2 except that a material composition (an α ratio: 0.95) obtained using 10 g of trimethylolpropane and 32.65 g of xylylene diisocyanate (XDI) was used.

Comparative Example 1

A surface protection film laminate was obtained in the same manner as in Example 1 except that a material composition (an α ratio: 0.95) obtained using 10.4 g of an alcohol-based curing agent having a weight ratio of 1,4-butanediol/trimethylolpropane=40/60 was used.

Comparative Example 2

A surface protection film laminate was obtained in the same manner as in Example 1 except that a material composition (an α ratio: 0.95) obtained using 10.5 g of an alcohol-based curing agent having a weight ratio of 1,4-butanediol/trimethylolpropane=60/40 was used.

Comparative Example 3

A prepolymer made of PTMG (manufactured by Mitsubishi Chemical Corporation, product name: PTMG1000) having a molecular weight of 1000 and hydrogenated MDI was prepared so that NCO%=10.0% is satisfied. After that, a surface protection film laminate was obtained in the same manner as in Example 1 except that a material composition (an α ratio: 0.95) obtained by adding 4.49 g of PTMG, 10.5 g of an alcohol-based curing agent having a weight ratio of 1,4-butanediol/trimethylolpropane=60/40, and 150 ppm of an organotin compound as a non-amine catalyst to 100 g of prepolymer was used.

Comparative Example 4

A surface protection film laminate was obtained in the same manner as in Example 1 except that a material composition (an α ratio: 0.95) obtained by adding 75 g of a low molecular weight polyol (manufactured by Mitsubishi Chemical Corporation, product name: HS0850), 21.88 g of xylylene diisocyanate (XDI), and 50 ppm of an organotin compound to 75g of succinic ester-based polyol (manufactured by Tosoh Corporation, product name: ON300) was used.

The surface protection film laminates produced in Examples 1 to 4 and Comparative Examples 1 to 4 described above were evaluated as follows. The results are shown in Table 1.

International Rubber Hardness Degree (IRHD)

A 1 cm square sample was cut from a created surface protection film laminate, a mold release film and a release film were released, after which hardness thereof on a protective layer side was measured in accordance with JIS K6253-2 using an IRHD rubber hardness tester (manufactured by HILDE).

Dynamic Viscoelasticity Test

A sample (a width of 5 mm and a length of 35 mm) was cut from a created surface protection film laminate and a mold release film and a release film were released. After that, the sample was attached to a dynamic viscoelasticity measurement device (manufactured by TA Instruments, device name: RSA3) after it has been subjected to "Set Gap" and "Offset Force To Zero." The sample was stretched so that Force has −1.0 to −3.0 N and then measured in accordance with JIS K7244-4.

Temperature dependence curves of the storage elastic modulus (E'), the loss elastic modulus (E"), and the loss tangent (the tan δ) under the following setting conditions were measured and the tan δ peak value, the tan δ peak temperature, the tan δ value at 25° C., and the storage elastic modulus at 25° C. were obtained.

(Setting Conditions)
Geometry type: tension/compression mode
Chuck distance: 20 mm
Sample width: 5 mm
Sample thickness: 150 μm
Frequency: 10 Hz
Initial temperature: −40° C.
End temperature: 100° C.
Temperature rising rate: 2° C./min
Distortion: 0.03%

Writing Sensation

A 10 cm square sample was cut from a created surface protection film laminate, a mold release film and a release film were released, and an exposed adhesive layer was adhered to a desk. After that, a touch pen made of a polyacetal resin (POM) (manufactured by WACOM, a distal end shape: a hemispherical shape with a diameter of 1.4 mm) was slid on a surface on the protective layer side and writing sensation was evaluated in accordance with the following criteria.

(Evaluation Criteria)
1: Pen tip slips and pen moves lightly.
2: Writing sensation equivalent to writing on paper using pencil.
3: Feeling of resistance is felt at the pen tip and pen moves heavily.

Rotary Writing Test

A 10 cm square sample was cut from a created surface protection film laminate, a mold release film and a release film were released, and an exposed adhesive layer was adhered to a testing stand. A small amount of silicone spray (manufactured by ICHINEN CHEMICALS Co., LTD., Silicone spray400, Ingredient: dimethyl silicone oil) was sprayed to a surface of a protective layer made of a polyurethane and then a counterpart member was brought into contact with the protective layer side and rotated 10,000 times under the following conditions and the film laminate which has been subjected to the test was visually evaluated in the following criteria.

(Measurement Condition)
  Counterpart member: POM (distal end shape: radius of curvature of 1.4 mm manufactured by WACOM)
  Load: 500 g
  Number of revolutions: 20 rpm
  Distance from center of rotation: 3 cm
(Evaluation Criteria)
  ○: No change in outer form is seen
  ×: Scratches, dents, and the like are seen

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Hardness (IRHD) | 91.5 | 97.5 | 93.2 | 87.1 | 93.2 | 90.0 | 86.2 | 99.0 |
| Tanδ peak value | 0.608 | 0.609 | 0.718 | 1.001 | 0.550 | 0.544 | 0.515 | 1.399 |
| Tanδ peak temperature | 44.9 | 36.2 | 23.9 | 13.4 | 54.0 | 48.5 | 44.7 | 39.3 |
| tanδ/25° C. | 0.330 | 0.509 | 0.695 | 0.586 | 0.217 | 0.277 | 0.351 | 0.270 |
| E'/25° C. | 2.13E+08 | 2.06E+08 | 4.42E+07 | 1.55E+07 | 3.44E+08 | 2.58E+08 | 1.56E+08 | 1.28E+09 |
| Writing sensation | 2 | 2 | 2 | 2 | 2 | 2 | 3 | 1 |
| Rotary writing test | ○ | ○ | ○ | ○ | ○ | × | × | × |

The surface protection films obtained in Examples 1 to 4 as the present invention had good writing sensation and rotary writing test results were good.

The surface protection films obtained in Comparative Examples 1 and 2 had good writing sensation, but had scratches in the surface of the protective layer which has been subjected to the rotary writing test.

In the surface protection film obtained in Comparative Example 3, the pen moved heavily. It is estimated that this is because the pen tip pushes too much into the protective layer due to a low international rubber hardness degree of 86.2. Furthermore, it is acknowledged that scratches were found in the surface of the protective layer which has been subjected to the rotary writing test as well as in Comparative Examples 1 and 2.

In the surface protection film obtained in Comparative Example 4, the pen moves lightly. It is estimated that this is because the pen tip does not push into the protective layer due to a high international rubber hardness degree of 99.0. Furthermore, it is not acknowledged that the protective layer which has been subjected to the rotary writing test had scratches, but dents occurred, which were not recovered.

What is claimed is:

1. A surface protection film, comprising:
   a protective layer made of a polyurethane on an outermost surface thereof,
   wherein the polyurethane has an international rubber hardness degree (IRHD) of 87.0 or more and 98.0 or less, a tan δ peak value of 0.6 or more and 1.39 or less, and a tan δ peak temperature of −20° C. or more and 36.2° C. or less, the protective layer has a thickness of 150 μm or more and 300 μm or less, and
   the polyurethane is a thermally cured product of a material composition comprising at least a polyol, an isocyanate, and an alcohol curing agent,
   the alcohol curing agent comprises 60 to 80 parts by weight of dihydric alcohol and 40 to 20 parts by weight of trihydric alcohol, and
   a ratio (—OH/—NCO) between a number of moles of hydroxyl groups (—OH) contained in the alcohol curing agent and a number of moles of isocyanate groups (—NCO) of the isocyanate in which the polyurethane is not thermally cured is 1.05 or more and 1.3 or less.

2. The surface protection film of a display according to claim 1, wherein the polyurethane is a polycarbonate-based polyurethane or a polyester-based polyurethane.

3. The surface protection film of a display according to claim 1, wherein at least three layers of the protective layer made of a polyurethane, a transparent base film, and an adhesive layer are laminated in this order.

4. The surface protection film of a display according to claim 3, wherein the polyurethane is a polycarbonate-based polyurethane or a polyester-based polyurethane.

5. A surface protection film laminate, comprising:
   a mold release film laminated on a surface of the surface protection film of a display according to claim 1 on the protective layer side; and
   a release film laminated on the other surface thereof.

6. A method for producing a surface protection film of a display having a protective layer made of a polyurethane on an outermost surface thereof and the polyurethane having an international rubber hardness degree (IRHD) of 87.0 or more and 98.0 or less, and a tan δ peak value of 0.6 or more and 1.39 or less, comprising:
   pouring a material composition into a gap between first and second gap holding members sent out using a pair of rolls spaced apart from each other; and
   thermally curing the material composition while the material composition is held between the first and second gap holding members to form the protective layer,
   wherein the polyurethane has a tan δ peak temperature of −20° C. or more and 36.2° C. or less,
   the protective layer has a thickness of 150 μm or more and 300 μm or less, and
   the polyurethane is a thermally cured product of a material composition comprising at least a polyol, an isocyanate, and an alcohol curing agent,
   the alcohol curing agent comprises 60 to 80 parts by weight of dihydric alcohol and 40 to 20 parts by weight of trihydric alcohol, and
   a ratio (—OH/—NCO) between a number of moles of hydroxyl groups (—OH) contained in the alcohol curing agent and a number of moles of isocyanate groups (—NCO) of the isocyanate in which the polyurethane is not thermally cured is 1.05 or more and 1.3 or less.

7. The method for producing a surface protection film of a display according to claim 6, wherein the polyurethane is a polycarbonate-based polyurethane or a polyester-based polyurethane.

8. The method for producing a surface protection film of a display according to claim 6, wherein one of the first and second gap holding members is set as a transparent base film of the surface protection film.

9. The method for producing a surface protection film of a display according to claim 8, wherein the other of the first and second gap holding members is a film having unevenness and the material composition is held on a side of the film having unevenness.

10. The method for producing a surface protection film of a display according to claim 6, wherein one of the first and second gap holding members is a film which is not subjected to a release treatment and the other thereof is a film which is subjected to a release treatment.

11. The method for producing a surface protection film of a display according to claim 10, wherein the other of the first and second gap holding members is a film having unevenness and the material composition is held on a side of the film having unevenness.

\* \* \* \* \*